VERTICAL AND LATERAL INTERLOCKING PACKING CASE

Filed Oct. 10, 1960 4 Sheets-Sheet 1

INVENTORS
STEPHEN KUZMA
MARSHALL R. SINGER
BY
Alvin Engelstein
ATTORNEY

VERTICAL AND LATERAL INTERLOCKING PACKING CASE

Filed Oct. 10, 1960 4 Sheets-Sheet 2

INVENTORS
STEPHEN KUZMA
MARSHALL R. SINGER
BY
Alvin Engelstein
ATTORNEY

VERTICAL AND LATERAL INTERLOCKING PACKING CASE

Filed Oct. 10, 1960 4 Sheets-Sheet 3

INVENTORS
STEPHEN KUZMA
MARSHALL R. SINGER
BY
Alvin Engelstein
ATTORNEY

Sept. 10, 1963 S. KUZMA ETAL 3,103,278

VERTICAL AND LATERAL INTERLOCKING PACKING CASE

Filed Oct. 10, 1960 4 Sheets-Sheet 4

INVENTOR
STEPHEN KUZMA
MARSHALL R. SINGER
BY
ATTORNEY 3,103,278
Patented Sept. 10, 1963

3,103,278

VERTICAL AND LATERAL INTERLOCKING PACKING CASE

Stephen Kuzma, Washington Township, Warren County, and Marshall R. Singer, New Milford, N.J., assignors to Allied Chemical Corporation, New York, N.Y., a corporation of New York Filed Oct. 10, 1960, Ser. No. 61,598
4 Claims. (Cl. 206—65)

This invention relates to packaging and more particularly to a new and improved multi-container package for handling of fragile, closely packed, liquid-filled containers.

One object of the present invention is to provide a new and improved packing case for safer, more efficient and more economical packaging of fragile containers.

Another object is to provide a packing case constructed of a material enabling the safe, close packing of fragile containers in a plurality of individual, internally disposed contoured pockets.

Another object is to provide a light-weight packing case for fragile containers which can be easily stacked in a variety of stable, sturdy arrangements.

Another object is to provide a light-weight packing case equipped with interchangeable, interlocking means for stacking a number of said cases in a variety of compact, stable arrangements.

A further object is to provide a packing case constructed throughout of a material providing protective cushioning of excellent shock absorption qualities for internally disposed fragile containers while in addition being capable of sustaining repeated external shocks and impacts.

A still further object is to provide a packing case of light-weight construction with attendant savings in freight and other handling charges.

Other objects and advantages will be apparent from the following description in which reference will be made to the accompanying drawings in which.

Figure 10:
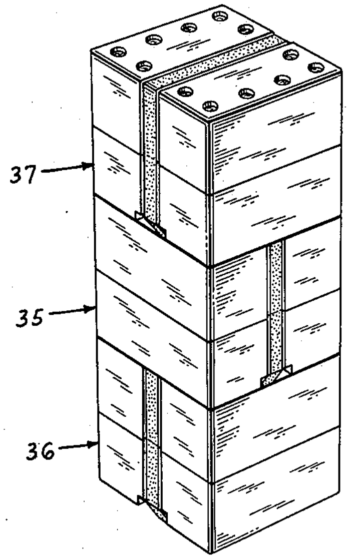
FIGURE 10 is a perspective view showing vertical stacking of the square-shaped packing case shown in FIGURES 1–8.

In the drawings FIGURES 1–11 illustrate a preferred form of the packing case of the present invention having a square outlined horizontal cross-section.

FIGURES 12–15 illustrate a packing case having a rectangular outlined cross-section.

Figure 1:
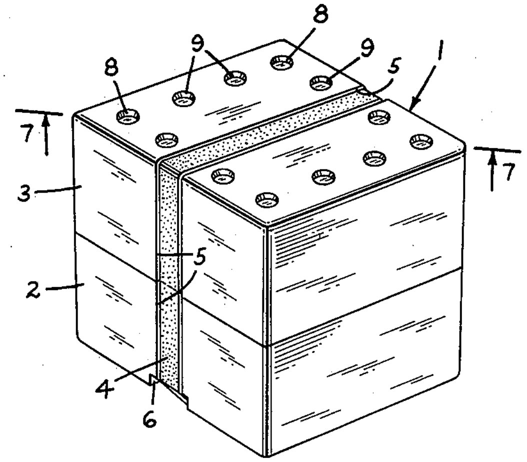
FIGURE 1 is a perspective view of one form of the invention showing an assembled divided square-shaped packing case comprising a base section and cover section held in contact by a pressure-sensitive tape.
Figures 2, 9:
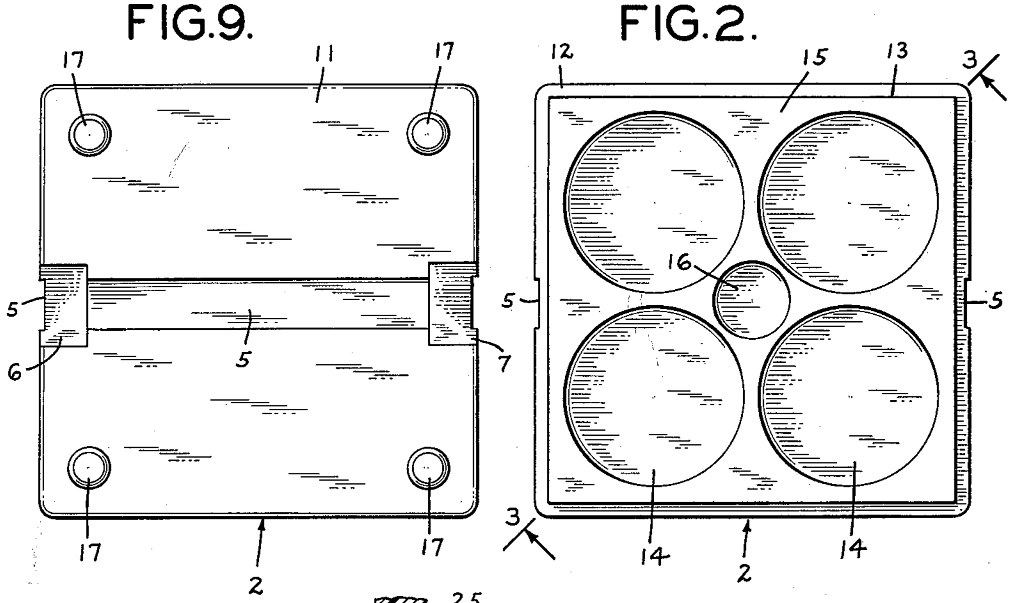
FIGURE 2 is a plan view of the top of the base section showing in detail a plurality of form-fitting lower pocket-forming portions adapted to receive the lower portion of packed fragile containers.
FIGURE 9 is a plan view of the bottom surface of the base section showing in detail a suitable arrangement of interlocking leg-like protrusions for stacking.
Figure 6:
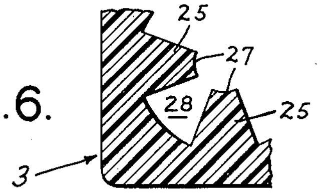
FIGURE 6 is a partial horizontal section taken along line 6—6 of FIGURES 4 and 7 showing horizontal outline of spiders forming an inner contoured portion of upper pocket-forming portions.

Referring to FIGURE 1, a preferred form of the invention is shown as an assembled packing case comprising a divided packing case body 1 of square outlined horizontal cross-section having a lower case-forming or base section 2 and an upper case-forming or cover section 3. Closure of the packing case is effected by a pressure-sensitive tape 4 extending across the line by engagement of the divided sections on opposing outer surfaces and binding base section 2 in contact with base section 3. A pressure-sensitive tape has been found to be particularly effective because of its flexibility and ease in applying and removing from the case. Tape 4 rests wholly within channel 5 which extends continuously around packing case 1 perpendicular to the line of engagement of the divided sections and is of sufficient depth to retain the binding means below the outer surfaces of said case to avoid interference with other objects in close relation therewith. A beveled cut-away 6 centered in the lower edge of base section 2 combines with a second beveled cut-away 7 in an opposing lower edge of base section 2 (as shown in FIGURE 9) to form grips for raising and handling the packing case. The grips are entirely recessed from the outer surfaces to permit close parallel alignment of adjacent vertical walls of two such cases when stacking. As also shown in FIGURE 9 a portion of beveled cut-aways 6 and 7 form a section of channel 5 in base section 2. Cup-like sockets 8 and 9 are formed in the top outer surface of cover section 3 to permit stacking of the cases in a variety of stable arrangements as more fully hereinafter described.

Figure 3:
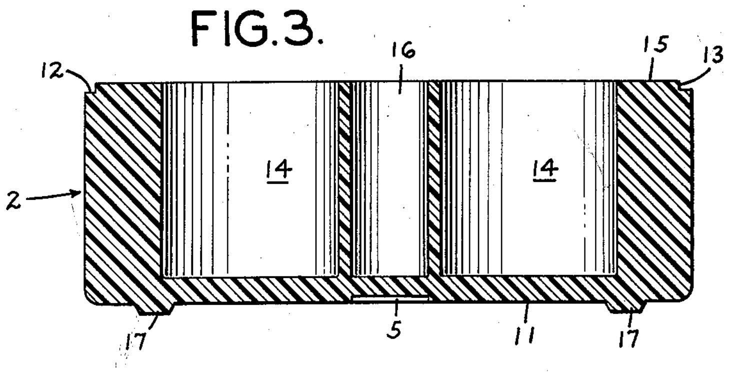
FIGURE 3 is a vertical section take along line 3—3 of FIGURE 2.

FIGURES 2 and 3 show in detail the lower case-forming or base section 2 having a square horizontal bottom surface 11 and upwardly extending wall portion with an upper end of square terminal configuration. Shoulder 12 and lip 13 extend continuously around the outer edge of said upper end. Base section 2 has a plurality of form-fitting lower pocket-forming portions 14 in spaced relation to the outer surfaces and extending inwardly from surface 15 and adapted to receive a lower cylindrical portion of a fragile container. Base section 2 also has a lower auxiliary pocket-forming portion 16 extending inwardly from surface 15 typically to the same depth as lower pocket-forming portions 14 and in spaced relation thereto. Molded-in leg-like protrusions 17 are formed on horizontal bottom surface 11 and interlock with cups 8 and 9 for stacking of the cases.

Figure 4:
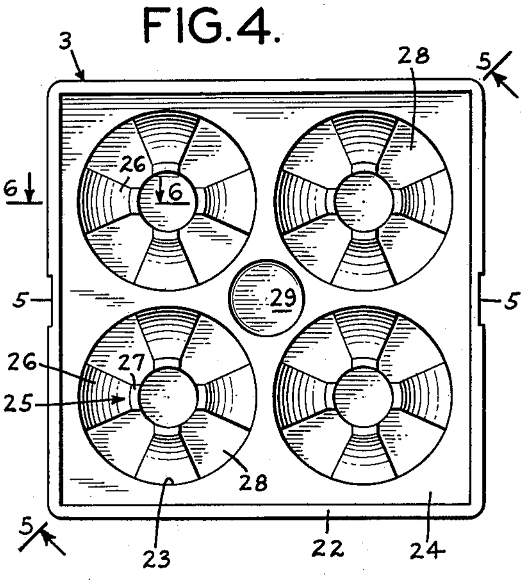
FIGURE 4 is a plan view of the underside of the cover section showing in detail a plurality of form-fitting upper pocket-forming portions adapted to receive the upper portion of packed fragile containers, each of said portions having a plurality of spaced slots capable of receiving a handle.
Figure 5:
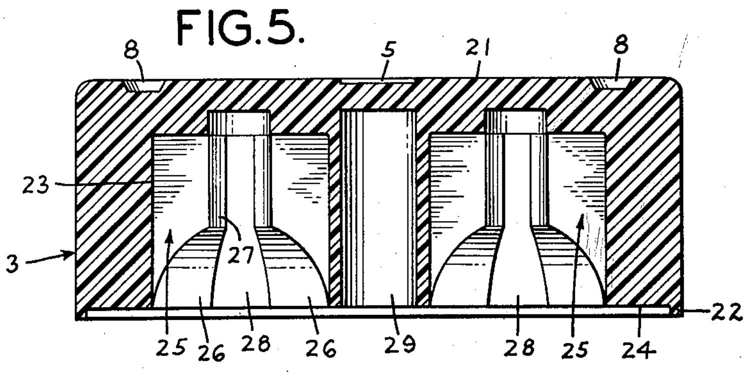
FIGURE 5 is a vertical section along line 5—5 of FIGURE 4.

FIGURES 4 and 5 show in detail an upper case-forming or cover section 3 having a square horizontal top surface 21 and a depending wall portion with a lower end of like terminal configuration. Extension member 22 extends around the outer edge of said lower end and is adapted to engage with shoulder 12 and lip 13 of base section 2 on assembly of the divided sections. Cover section 3 has a plurality of form-fitting upper pocket-forming portions 23 in spaced relation to the outer surfaces thereof and extending inwardly from surface 24 and adapted to receive an upper portion of a fragile container. Contour of pocket-forming portions 23 is formed by a plurality of spiders 25 having a lower end surface 26 of curved contour conforming to the upper curved body of a fragile container. An upper planar end surface 27 is adapted to hold snugly the neck portion of the container. As shown in detail in FIGURE 6, spiders 25 combine with the inner walls of pocket-forming portions 23 to form a plurality of spaced slots 28 adapted to receive a handle when the package container is of the jug type. Slots 28 further serve to conserve on construction material without reducing cushioning or strength of the packing case. Spaced slots 28 need not fit snugly about container handles but are preferably loose fitting being in width as much as 1½ to 3 times the thickness of the handle. With a plurality of loose fitting slots 28, preferably 4 in number as shown, the need for careful alignment of container handles is substantially eliminated thereby facilitating the placement of cover section 3 on the base section 2. Cover section 3 also has an upper auxiliary pocket-forming portion 29 extending inwardly from surface 24 typically to the same depth as pocket-forming portions 23 and in spaced relation thereto. FIGURE 5 also shows cup-like sockets 8 which interlock with legs 17 to permit vertical stacking of the cases.

Figure 7:
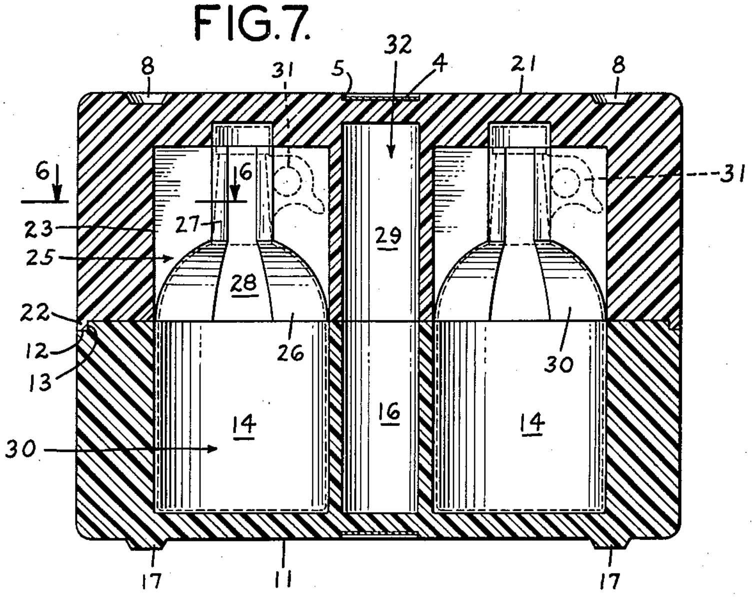
FIGURE 7 is a sectional view taken along line 7—7 of FIGURE 1 showing an interior portion of the packing case with phantom lines showing fragile containers disposed in contoured pockets.

As shown in FIGURE 7 the assembled case body has shoulder 12 and lip 13 of base section 2 mating on engagement with extension member 22 of cover section 3 thereby restraining horizontal movement of base section 2 in relation to cover section 3. Packing case 1 comprising base section 2 and cover section 3 is constructed throughout of a molded rigid resilient foamed synthetic plastic material, preferably polystyrene, having a multiplicity of closed discrete non-communicating cells and a density with the range of 0.7 to 2.0 lbs./cu. ft. On engagement the form-fitting lower pocket-forming portions 14 of base section 2 corresponds concentrically with upper pocket-forming portions 23 of cover section 3 to form a plurality of internally disposed form-fitting pockets 30 providing an excellent protective cushioning with maximum shock absorption for fragile liquid-filled containers 31 disposed therein as shown in phantom outline in FIGURE 7. Pockets 30 are preferably adapted to fit snugly about containers 31 to provide maximum uniform shock absorption. Lower auxiliary pocket-forming section 16 corresponds concentrically on engagement with upper auxiliary pocket-forming portion 29 of cover section 3 to form auxiliary pocket 32 which provides a space for packing a sample container, instruction literature for use of the packaged contents, etc. Upper auxiliary pocket-forming portion 29 is desirably of slightly greater diameter, typically a ¼ inch greater diameter than lower pocket-forming portion 16 to facilitate assembly when an article to be enclosed in pocket 32 protrudes from the lower pocket-forming portion 16. Pocket 32 is typically of cylindrical shape as shown with a cross-sectional area less than ¼ that of the maximum diameter of pockets 30. Auxiliary pocket 32 further serves to conserve on construction material without reducing the cushioning properties or strength of the package.

A factor important to the successful use of lightweight packing cases for fragile containers resides in the stacking of such packages. Because of their light weight relatively small stacks of such cases are subject to tilting and swaying with the resulting shift of center of gravity causing toppling of the stack. Consequently, a severe limitation is placed on stacking height, even when much time is spent in careful stacking to assure proper alignment. Furthermore, contact with foreign bodies often results in disarrangement and toppling which would not otherwise occur with similar objects of heavier weight.

Figure 8:
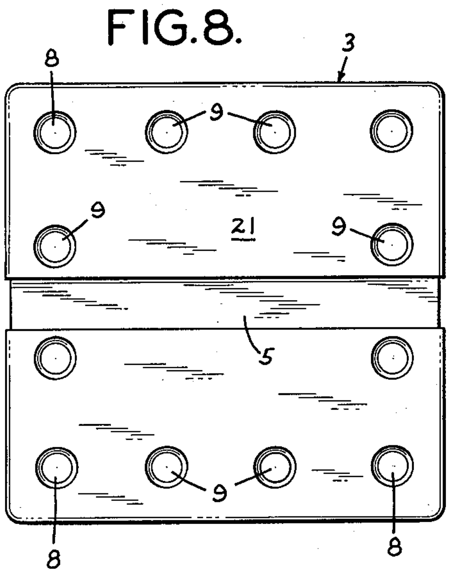
FIGURE 8 is a plan view of the top surface of a cover section of the packing case showing in detail a suitable arrangement of interlocking cup-like depressions for stacking.

To substantially reduce the danger of toppling opposing outer surfaces of the packing case have respectively a plurality of depressions and protrusions to fit with mating protrusions and depressions, respectively, of other packing cases. As shown in FIGURE 8, a plurality of cup-like depressions 8 are formed in fixed relation to each other in outer surface 21 of cover section 3. Cups 8 interlock with a plurality of leg-like protrusions 17 formed (as shown in FIGURE 9) and in fixed relation to each other on opposing outer surface 11 of base section 2 to permit vertical stacking of the packing cases. Cups 8 interlock with legs 17 interchangeably, that is, whenever the packing case is rotated on a central axis from an original interlocking position to a position in which all the sides of one case are parallel with sides of equal width of a second case interlocked therewith. The interchangeable feature is important because it expedites stacking by giving the stacker a number of immediate choices assuring the best possible alignment. Outer surface 21 also has a plurality of cup-like depressions 9 in fixed relation to each other. Cups 9 mate with legs 17 formed on the opposing outer surface 11 of other such cases to permit lateral interchangeable interlocking stacking when overlapping at least two of such cases having adjacent vertical surfaces in close parallel relation. Cups 9 interlock with legs 17 to permit multi-lateral stacking, that is, capable of interlocking in a lateral direction whenever any two parallel sides of an upper case are vertically aligned with the sides of equal length of a lower case in contact therewith.

Figure 11:
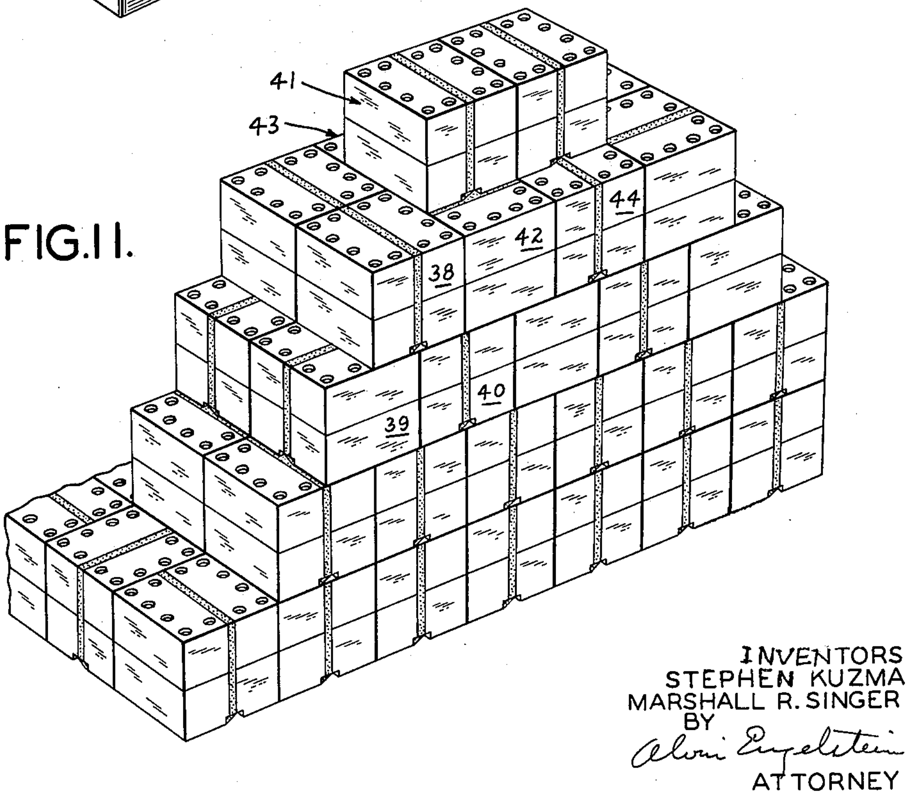
FIGURE 11 is a perspective view showing vertical and lateral stacking of square-shaped packing cases.

FIGURES 10 and 11 illustrate the stacking of the packing case shown in detail in FIGURES 1–9. In FIGURE 10, the binding tape on case 35 is rotated 90 degrees relative to the tapes on cases 36 and 37 to illustrate the interchangeable feature. For the square-shape packing case as shown in FIGURES 1–9, it will be evident that cases 35 and 37 may be interchangeably interlocked in four positions when rotated relative to cases 36 and 35, respectively. FIGURE 11 illustrates particularly the lateral stacking of the packing case. Lateral stacking must also be interchangeable. Thus, as evident from the drawings, case 38 may be rotated to interlock in four positions while laterally overlapping cases 39 and 40. Regarding the multi-lateral feature, case 41 overlaps the rear side-edge of the top surface of case 42 and is interlocked therewith and case 43. Case 41 will also interlock with other adjacent cases when overlapping the other three sides of case 42. Thus case 41 will interlock with case 38 when overlapping the left side-edge of case 42, with case 44 when overlapping the right side edge of case 42, and with a case (not shown) when overlapping the front side edge of case 42.

Figure 12:
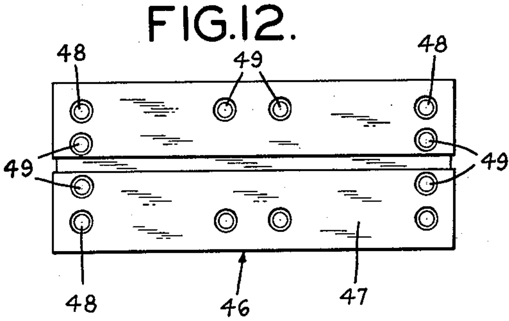
FIGURE 12 is a plan view of the top surface of a cover section showing in detail a suitable arrangement of cup-like stacking means for a rectangular-shaped packing case.
Figure 13:
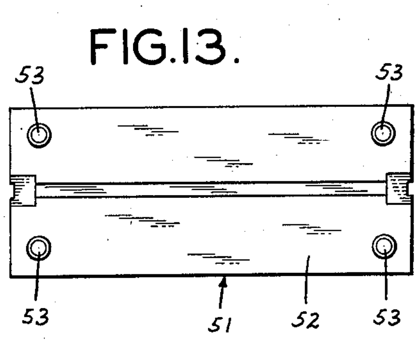
FIGURE 13 is a plan view of the bottom surface of a base section showing in detail a suitable arrangement of leg-like stacking means for a rectangular-shaped packing case.

FIGURE 12 shows a cover section 46 of another form of the packing case having rectangular outlined cross-section. Horizontal outer surface 47 of cover section 46 has a plurality of cups 48 and 49 in fixed relation to each other. In FIGURE 13 there is shown a base section 51 of a rectangular packing case having the cover section 46 shown in FIGURE 12. Base section 51 has a horizontal outer surface 52 with a plurality of leg-like protrusions 53. Cups 48 of cover section 46 interlock interchangeably with legs 53 of base section 51 to permit vertical stacking of the rectangular cases. Cups 49 of cover section 46 mate with legs 53 of other such cases to permit interchangeable, multi-lateral stacking. As shown, cups 49 are positioned to interlock with legs 53 when one-half of surface 47 is overlapped by one-half of a surface 52 of a second rectangular packing case.

Figures 14, 15, 16:
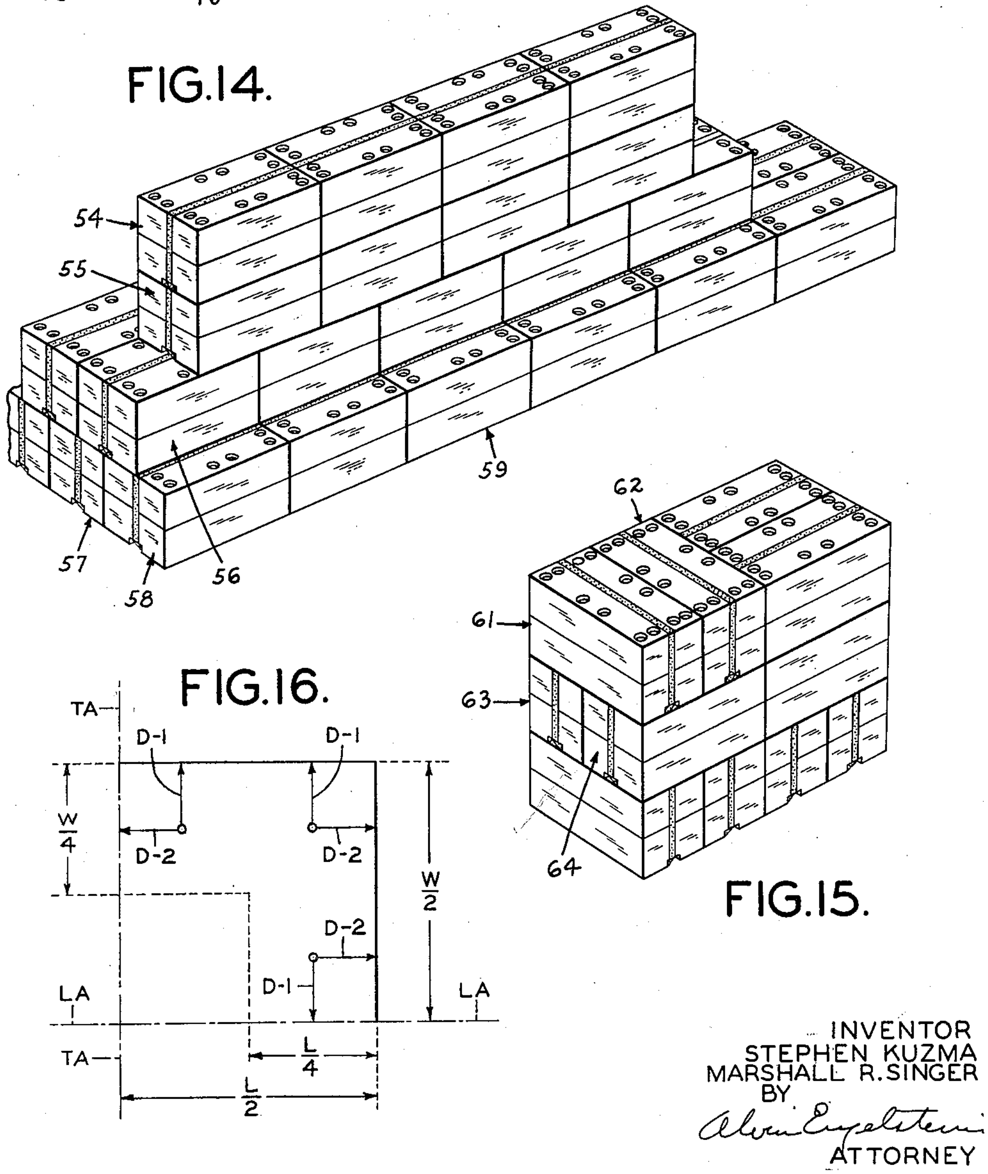
FIGURE 14 is a perspective view showing vertical and lateral stacking of rectangular-shaped packing cases.
FIGURE 15 is a perspective view showing a cross-stacking arrangement of rectangular packing cases.
FIGURE 16 is a diagram showing dimensional arrangement of cup-like sockets for stacking.

FIGURE 14 illustrates the stacking of the typical rectangular packing case shown in FIGURES 12 and 13. Case 54 is interlocked with case 55 to illustrate vertical stacking. For the rectangular case 54 there are two interchangeable positions in which case 54 can be rotated to interlock with case 55. Lateral stacking of rectangular cases must also be interchangeable. Thus, as evident from the drawings, case 56 will interlock in two positions when overlapping case 57 and 58. Case 56 also interlocks multi-laterally when overlapping case 58. As shown, case 56 overlaps the rear side-edge of the top surface of case 58 and is interlocked therewith and case 57. Case 56 will also interlock with other adjacent cases when overlapping the other three sides of case 58. Thus, case 56 will interlock with an adjacent case (not shown) when overlapping the left side edge of case 58, with case 59 when overlapping the right side edge of case 58, and with an adjacent case (not shown) when overlapping the front side edge of case 58.

In FIGURE 15 there is shown a preferred packing case with length two times width enabling interlocking cross-stacking. As shown, cases 61 and 62 have adjacent vertical lengthwise surfaces in close parallel relation and interlock perpendicularly to the lengthwise dimensions of cases 63 and 64 having adjacent vertical lengthwise surfaces in close parallel relation. Cross-stacking of rectangular cases having length two times width is also interchangeable and multi-lateral.

In FIGURE 16 there is shown a diagram illustrating the required dimensional arrangement of interlocking means to achieve vertical and multi-lateral interchangeable stacking. The diagram of FIGURE 16 shows particularly one quadrant of a horizontal planar surface of a typical packing case of this invention having parallel length edges with a length dimension L and a longitudinal axis LA, and parallel width edges with a width dimension W and transverse axis TA. The quadrant shown corresponds to a quadrant of the packing case shown in FIGURES 1–11. However, it will be understood that dimensions given by FIGURE 16 are applicable to packing cases having either a square outlined cross-section in which L equals W or a rectangular outlined cross-section in which L is greater than W.

In positioning the interlocking means at least 3 cup-like sockets of short vertical axis depth are indented into each top-side face quadrant. A first socket is positioned in the top-side face quadrant adjacent such face corner, such socket axis being spaced from the adjacent length edge a distance D–1 which is less than W/4 and from the adjacent width edge a distance D–2 which is less than L/4. A second socket is positioned in the quadrant adjacent said length edge, such socket axis being spaced from such edge a distance D–1 and from the adjacent TA a distance D–2. A third socket is positioned in the quadrant adjacent said width edge, such socket axis being spaced from such edge a distance D–2 and from the adjacent LA a distance D–1. At least three sockets are positioned in each of the remaining three quadrants, the three sockets of each such quadrants being positioned therein so that the sockets of any of the four quadrants are symmetrically placed with regard to the sockets of each of the two adjacent quadrants. On the bottom underside face duplicating the top-side face edgewise and dimensionally there are at least four leg-like protrusions projecting downwardly therefrom to nest in a socket configured the same as said top-side sockets and positioned so that the vertical axes thereof are respectively in vertical axial alignment with vertical axes of at least four topside face sockets nearest adjacent respective corners of said face.

The body of packing case 1 comprising base section 2 and cover section 3 is constructed throughout of a rigid resilient foamed synthetic plastic material, preferably a foamed polystyrene. Other suitable materials include a rigid foamed polyurethane, polyvinyl chloride, polyethylene, polyvinylidene chloride, polyacrylic esters, and polymethacrylic esters. The individual sections are preferably made by molding in an operation involving providing a mold of the necessary internal shape to yield the particular section to be produced, charging sufficient expandable synthetic plastic material to fill the mold space after final expansion, and expanding said plastic material to produce the desired section.

When the case body is to be constructed of foamed polystyrene, the molding operation employs a pre-expanded starting material. In this method, small particles of a porous pre-expanded polystyrene are introduced into the mold space in predetermined quantity which fills a portion typically about 90 to 95 percent of the mold space, and sufficient to completely fill the mold after final expansion. The mold is then closed. The pre-expanded particles still contain as expanding agent a liquid in which the thermoplastic is insoluble and having a lower boiling point than the softening point of the thermoplastic, for instance petroleum ether having a boiling range of about 68° F.–140° F. The liquid expanding agent is present in the pre-expanded particles in typical amounts of about 4 to 12 percent by weight (based on total weight of the mixture). Other liquid expanding agents that can be used include heptane, pentane, cyclopentane, hexane and cyclohexane.

The pre-expanded particles are heated in the enclosing mold by direct contact with steam introduced into the mold space to a temperature above the boiling point of the liquid expanding agent and above the softening point of polystyrene, preferably to a temperature of about 10° to 25° F. higher than the first heating for the partial expansion. The second heating heating causes the thermoplastic to finally expand or foam-up to completely fill the mold space. The time required for the final expansion is typically about 1–5 minutes. During a substantial portion of the heating vapors and gases are allowed to escape through small openings provided in the mold.

The resulting foamed section produced as above is then cooled to handling temperature, typically about 70 to 80° F. while in the mold by cessation of heating and permitting the foamed polystyrene to cool. If desired, water may be sprayed on the mold to hasten the cooling. The mold is then opened and the desired individual section withdrawn therefrom.

In preparing the porous, pre-expanded, incompletely expanded particles, the thermoplastic particles containing the liquid expanding agent are heated above the softening point for a period sufficient to evaporate off only a portion of the expanding agent. The pre-expansion heating can be carried out by means of steam, infrared radiation or hot water. For instance, with polystyrene beads containing the petroleum ether as expanding agent, incomplete foaming-up of the beads can be effected by heating the beads at temperature of about 220° to 250° F. for about 1–2 minutes. The porous pre-expanded polystyrene particles have typical diameter of about .08" to .12" and bulk density of about 1.1 to 1.3 lbs. per cu. ft.

For packaging fragile liquid-filled containers to which this invention is specifically directed the foamed polystyrene material has a density within the range of about 0.7 to 2.0 lbs./cu. ft., preferably 1.1 to 1.5 lbs./cu. ft. Above 2.0 lbs./cu. ft. the protective cushioning of the foamed synthetic material is depreciated and the danger of breakage increased. Below 0.7 lb./cu. ft. the foamed material lacks sufficient resistance to compression to provide adequate protection with more localized shock impact resulting in increased danger of breakage. The foamed polystyrene also comprises a multiplicity of closed, discrete, non-communicating cells which, in contrast to material having open, communicating cells, provides extremely high resistance to the passage of water enabling the package to be stored exposed to the atmosphere and elements for prolonged periods of time. More important, the closed cell construction prevents leakage of container contents through walls in the event breakage does occur. Combined with the excellent chemical resistance of the polystyrene, the packing case is superior to the prior art corrugated fibre case which is subject to deterioration and leakage of contents upon breakage of containers containing substances such as mineral acids.

The individual sections comprising the packing case may be made from rigid resilient foams of polyvinyl chloride, polyethylene, polyvinylidine chloride, polyacrylic or polymethacrylic esters in procedures substantially the same as that employed with polystyrene.

When a foamed polyurethane is used, a somewhat different procedure is employed and the pre-expansion step is eliminated. In this procedure a liquid mixture comprising an organic polyisocyanate, a polyol such as a polyester or polyether and a blowing agent such as water or a low boiling fluorinated hydrocarbon is poured into the mold space. The polyisocyanate and polyol react within the enclosed mold space at room temperature whereby the reaction product foams up to fill the mold space. The foamed section as formed is then maintained within the mold for a period sufficient to cure the foamed cellular polyurethane.

A specific embodiment illustrated by the divided packing case 1 shown in FIGURES 1 to 9 has a square outlined horizontal cross-section and comprises a base section 2 and a cover section 3. Height of the assembled case is about 14 inches. Base section 2 has a horizontal bottom surface 11 of dimensions 13$\frac{1}{16}$ inches by 13$\frac{1}{16}$ inches and a wall portion extending upwardly 7.0 inches to an upper end surface 15 of square configuration. Shoulder 12 and lip 13 extened continuously around said base section and form the upper outer end portion thereof. Shoulder 12 and lip 13 have dimensions of ½ inch and $\frac{5}{16}$ inch, respectively. Distances between parallel outer surfaces of base section 2 is 13½ inches at shoulder 12. Cover section 3 has a horizontal top surface 21 of square outline with dimensions 13$\frac{1}{16}$ inches by 13$\frac{1}{16}$ inches and a wall portion depending therefrom 7⅛ inches to a lower terminal portion of square configuration having dimensions 13$\frac{7}{16}$ by 13$\frac{7}{16}$ inches, said terminal portion being formed by extension member 22 which extends horizontally and inwardly a distance of $\frac{7}{16}$ inch from the lower outer edge and rises above surface 24 a distance of ¼ inch. Vertical axis of four internally disposed pockets 30 are distanced at surface 15 about 3⅝ inches from the outer vertical surfaces of base section 2. Minimum wall thickness between pockets 30 and outer vertical surfaces at surface 15 is about ⅞ inch. Minimum wall thickness between the respective pockets 30 is about 0.75 inch. Lower pocket-forming portions 14 of base section 2 have a diameter of about 5⅜ inches and a depth of about 6 inches from upper surface 15. Upper pocket-forming portions 23 have a diameter at surface 24 of about 5⅜ inches and contour-taper upwardly therefrom along surfaces 26 of spiders 25 a vertical distance of 2½ inches to a diameter of 2½ inches. Upper planar end surfaces 27 of spiders 25 incline upwardly a vertical distance of 2¾ inches to a cylindrically contoured portion having a diameter 2.0 inches and depth ⅞ inch, said last contoured portion being adapted to receive the top of the packaged container. Four spaced slots 28 extend vertically inward from surface 24 a distance of 5$\frac{5}{16}$ inches and have width 2 inches along the inner vertical wall tapering to a width of ¾ inch between adjacent planar end surfaces 27 of spiders 25. Auxiliary semi-pocket portion 16 has a diameter of 2⅛ inches extending a depth of 6 inches from surface 15 of base section 2. Closure of the case concentrically aligns pocket 16 with auxiliary semi-pocket portion 29 having a diameter of 2⅜ inches extending from surface 24 a distance of 6⅛ inches into cover section 3 thereby forming internally disposed auxiliary pocket 32. Auxiliary pocket 32 is equally spaced in relation to pockets 30 with a wall thickness of $\frac{7}{16}$ inch at the points of minimum separation between these compartments in base section 2. Beveled cut-aways 6 and 7 about 2$\frac{9}{16}$ inches in width are centered in opposing lower horizontal edges of base section 2 providing excess gripping means for raising and handling the packing case. Cut-aways 6 and 7 extend ¾ inch in height along the vertical surface and 1⅜ inches along surface 11 of base section 2. Channel 5 has a width of 1⅝ inches and depth $\frac{3}{32}$ inch and extends continuously around the vertical mid-section of packing case 1. All outer and inner vertical surfaces of the case body were tapered 0.5 to 1.5 degrees to facilitate removal from the mold during manufacture. Cup-like depressions 8 and 9 are equally spaced a distance of 3$\frac{13}{32}$ inches on the outer surface 21 of cover section 3. Distance from the centerline of all cups 8 and 9 to the closest edge of surface 21 is about 1$\frac{27}{64}$ inches. Leg-like protrusions 17 are equally spaced 10$\frac{7}{32}$ inches and are positioned a distance of about 1$\frac{27}{64}$ inches from the closest edge of surface 11.

A packing case body having the above dimensions was constructed throughout of foamed polystyrene having a multiplicity of closed, non-communicating cells and a density of 1.25 lbs./cu. ft. Each of the four pockets was fitted with an 80 oz. flint glass jug filled with water. Closure was effected by a 1½ inch pressure sensitive tape 4 extending around the case in channel 5 and overlapping about four inches at the top of cover section 3. The particular tape employed comprised a latex saturated flat-back paper having a rubber-resin pressure sensitive adhesive, being of the type designated as No. 161 tape by the Behr-Manning Mfg. Co. This package was then drop-tested to determine the ability of the packing case to absorb shock without breakage of the contents. In a first test the package was dropped from a height of 4 feet on its bottom, side, and top. After a total of ten drops the case was opened and examination of the contents showed no breakage of the glass jugs. This compared with breakage after an average of 2.2 drops in the same test of the prior art fibre corrugated case containing the same flint glass jugs. In another test, an identical package containing 4 water-filled glass jugs was subjected to the severe corner drop test. In this test the package was dropped from 4 feet onto a 2 x 4 wooden board. The package was dropped 8 times, one drop on each corner, after which inspection showed no breakage of the contents. In a comparison test, the prior art fibre corrugated case containing the same flint glass jugs was subjected to the same 4 foot drop test onto a 2 x 4 wooden board with three jugs breaking immediately on the first drop.

Although certain preferred embodiments of the invention have been disclosed for purpose of illustration, it will be evident that various changes and modifications may be made therein without departing from the scope and spirit of the invention.

We claim:

1. A vertical walled packing case of rectilinear horizontal cross section formed of molded foam synthetic plastic material having multiplicity of closed non-communicating cells and a lbs./cu. ft. density of more than 0.7 to less than 2, said case having cover and base sections with rectilinear matching faces and providing in each said sections form-fitting semi-pocket portions opening at said matching faces of size and shape cooperatively to snugly enclose a fragile article of predetermined size and shape upon assembly of said sections with said matching faces in engagement and in registering relation, said base and cover sections providing cooperating and interfitting extension and receptacle members adapted to maintain said matching faces in such relation, said base section providing a pair of spaced protrusions from the bottom thereof equidistant from a first side thereof and equidistant from the sides thereof intersecting said first side, a second pair of spaced protrusions equidistant from the side thereof opposite said first side and equidistant from said intersecting sides, sockets molded in the upper face of said cover section corresponding in dimension, number and location with respect to the sides thereof to the aforesaid two pairs of protrusions, two pairs of additional similarly dimensioned sockets, one pair thereof being disposed in alignment with and between the pair of sockets adjacent one side of said upper face and the other pair being similarly disposed with respect to the pair of sockets adjacent the opposite side of said upper face, each of the sockets of said last named two pairs thereof being spaced from a line perpendicular to and bisecting the last named opposite sides of said upper face by a distance substantially equal to that between each of the end sockets aligned therewith and the adjacent side of said upper face intersecting the said opposite sides thereof, whereby said packing case may be stacked in interlocking relation with respect to similar cases thereabove and therebelow selectively in vertical alignment and in snugly fitting staggered relationship.

2. The packing case of claim 1 wherein an additional two pairs of sockets are provided in the top surface of the cover section in alignment with and between the pairs of sockets adjacent the sides thereof intersecting the opposite sides described and spaced from the median of the intersecting sides by distance substantially equal to that between said last named sockets and said opposite sides, whereby the packing cases may be stacked in interlocking and snugly fitting staggered relationship in either of at least two directions with respect to upper and lower similar cases.

3. The packing case of claim 1 wherein the cover and base section provide grooves molded in the outer surfaces thereof positioned to be spaced from each of said sockets and protrusions and to form a continuous recess around the closed case of sufficient depth and width to receive the entirety of pressure-sensitive tape wrapped therearound.

4. A vertical walled packing case of rectilinear horizontal cross section formed of molded foam synthetic plastic material having multiplicity of closed non-communicating cells and a lbs./cu. ft. density of more than 0.7 to less than 2, said case having cover and base sections with rectilinear matching faces and providing upper and lower form-fitting semi-pocket portions opening at said matching faces of size and shape cooperatively to snugly enclose a fragile article of predetermined size and shape upon assembly of said sections with said matching faces in engagement and in registering relation, the upper form-fitting semi-pocket portions provided with contouring means to adapt such portions to receive the upper end of a necked, fragile container, said contouring means comprising a centering spider including a plurality of molded-on, spaced-apart, inwardly extending, radially disposed projections each inwardly surfaced to conform snugly with an immediately adjacent surface of a container neck, said projections spaced apart sufficiently to permit ready reception of an outwardly extending, radially disposed handle carried by a necked container, said base and cover sections providing cooperating and interfitting extension and receptacle members adapted to maintain said matching faces in such relation, the cover and base section providing grooves molded in the outer surfaces thereof positioned to be spaced from each of said sockets and protrusions and to form a continuous recess around the closed case of sufficient depth and width to receive the entirety of pressure-sensitive tape wrapped therearound, said base section providing a pair of spaced protrusions from the bottom thereof equidistant from a first side thereof and equidistant from the sides thereof intersecting said first side, a second pair of spaced protrusions equidistant from the side thereof opposite said first side and equiditant from said intersecting sides, sockets molded in the upper face of said cover section corresponding in dimension, number and location with respect to the sides thereof to the aforesaid two pairs of protrusions, two pairs of additional similarly dimensioned sockets, one pair thereof being disposed in alignment with and between the pair of sockets adjacent one side of said upper face and the other pair being similarly disposed with respect to the pair of sockets adjacent the opposite side of said upper face, each of the sockets of said last named two pairs thereof being spaced from a line perpendicular to and bisecting the last named opposite sides of said upper face by a distance substantially equal to that between each of the end sockets aligned therewith and the adjacent side of said upper face intersecting the said opposite sides thereof, an additional two pairs of sockets in the top surface of the cover section in alignment with and between the pairs of sockets adjacent the sides thereof intersecting the opposite sides described and spaced from the median of the intersecting sides by distance substantially equal to that between said last named sockets and said opposite sides, whereby the packing cases may be tacked in interlocking and snugly fitting staggered relationship in either of at least two directions with respect to upper and lower similar cases.

References Cited in the file of this patent

UNITED STATES PATENTS

| | | |
|---|---|---|
| 1,202,642 | Allen | Oct. 24, 1916 |
| 1,771,264 | Marrits | July 22, 1930 |
| 2,506,844 | Smith | May 9, 1950 |
| 2,715,458 | Polglase | Aug. 16, 1955 |
| 2,755,954 | Antritter | July 24, 1956 |
| 2,860,768 | Smithers | Nov. 18, 1956 |
| 2,939,603 | Young | June 7, 1960 |
| 2,979,194 | Andren | Apr. 11, 1961 |

FOREIGN PATENTS

| | | |
|---|---|---|
| 29,212 | Great Britain | 1910 |
| 892,049 | Germany | Oct. 5, 1953 |
| 326,589 | Switzerland | Feb. 15, 1958 |

OTHER REFERENCES

Modern Packaging (publication), p. 115, November 1956.